(12) United States Patent
Chow

(10) Patent No.: US 9,110,840 B2
(45) Date of Patent: Aug. 18, 2015

(54) BASE FOR A TABLET COMPUTER

(71) Applicant: Hewlett-Packard Development Company, L.P., Houston, TX (US)

(72) Inventor: John W. Chow, Taipei (TW)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 315 days.

(21) Appl. No.: 13/756,356

(22) Filed: Jan. 31, 2013

(65) Prior Publication Data

US 2014/0215114 A1    Jul. 31, 2014

(51) Int. Cl.
*G06F 13/00* (2006.01)
*G06F 13/14* (2006.01)

(52) U.S. Cl.
CPC ..................... *G06F 13/14* (2013.01)

(58) Field of Classification Search
CPC ... G06F 1/1632; G06F 1/1626; G06F 13/409; G06F 1/1616; G06F 13/385
USPC ......................................................... 710/303
See application file for complete search history.

(56) References Cited

U.S. PATENT DOCUMENTS

| | | | | |
|---|---|---|---|---|
| 5,375,076 | A  * | 12/1994 | Goodrich et al. | 361/679.17 |
| 5,983,073 | A  * | 11/1999 | Ditzik | 455/11.1 |
| 6,028,764 | A  * | 2/2000 | Richardson et al. | 361/679.29 |
| 6,219,037 | B1 * | 4/2001 | Lee | 345/167 |
| 6,790,178 | B1 * | 9/2004 | Mault et al. | 600/300 |
| 6,856,506 | B2 * | 2/2005 | Doherty et al. | 361/679.27 |
| 7,028,128 | B2 * | 4/2006 | Zhang et al. | 710/305 |
| 7,047,339 | B2 * | 5/2006 | Oakley | 710/303 |
| 8,254,992 | B1 | 8/2012 | Ashenbrenner et al. | |
| 8,423,696 | B2 * | 4/2013 | Thordarson | 710/301 |
| 2003/0100263 | A1 * | 5/2003 | Tanaka et al. | 455/41 |
| 2003/0112585 | A1 * | 6/2003 | Silvester | 361/679 |
| 2003/0198008 | A1 * | 10/2003 | Leapman et al. | 361/681 |
| 2004/0204041 | A1 * | 10/2004 | Fillebrown et al. | 455/556.1 |
| 2006/0061963 | A1 | 3/2006 | Schrum | |
| 2007/0174531 | A1 * | 7/2007 | Liberty | 710/303 |
| 2008/0002350 | A1 * | 1/2008 | Farrugia | 361/686 |
| 2008/0081614 | A1 * | 4/2008 | Lee et al. | 455/426.1 |
| 2009/0059907 | A1 * | 3/2009 | Sindhwani et al. | 370/354 |
| 2011/0200121 | A1 * | 8/2011 | Costa et al. | 375/240.26 |
| 2012/0099566 | A1 * | 4/2012 | Laine et al. | 370/338 |

(Continued)

FOREIGN PATENT DOCUMENTS

| | | | | | |
|---|---|---|---|---|---|
| CN | 102866740 | A | * | 1/2013 | G06F 1/1613 |
| CN | 203299688 | U | * | 11/2013 | G06F 1/16 |

(Continued)

*Primary Examiner* — Faisal M Zaman
(74) *Attorney, Agent, or Firm* — Hewlett-Packard Patent Department

(57) ABSTRACT

An example of a base apparatus for use by a tablet computer is disclosed. The base apparatus can include a first peripheral device capable of operating according to a first wireless communication protocol; a first demultiplexer coupled to the first peripheral device; and a first wireless communication module coupled to the first demultiplexer. The first demultiplexer is to transmit signals received from the first peripheral device to the tablet computer in a wired way or transmit signals received from the first peripheral device to the first wireless communication module based on whether the tablet computer is connected to or detached from the base apparatus. The first wireless communication module is to transmit wirelessly signals received from the first demultiplexer to the tablet computer.

20 Claims, 2 Drawing Sheets

(56) References Cited

U.S. PATENT DOCUMENTS

| | | | |
|---|---|---|---|
| 2012/0252230 A1* | 10/2012 | Alameh et al. | 439/31 |
| 2013/0077229 A1* | 3/2013 | Tsai et al. | 361/679.31 |
| 2013/0109371 A1* | 5/2013 | Brogan et al. | 455/420 |
| 2013/0194495 A1* | 8/2013 | Pan | 348/515 |
| 2013/0201097 A1* | 8/2013 | Pasquero et al. | 345/156 |
| 2013/0262248 A1* | 10/2013 | Kim et al. | 705/17 |
| 2014/0049911 A1* | 2/2014 | Corbin et al. | 361/679.58 |
| 2014/0055945 A1* | 2/2014 | Sudak | 361/679.41 |
| 2014/0083883 A1* | 3/2014 | Elias | 206/320 |
| 2014/0111912 A1* | 4/2014 | Gobeil | 361/679.01 |
| 2014/0173155 A1* | 6/2014 | Slattery | 710/303 |

FOREIGN PATENT DOCUMENTS

| | | | | |
|---|---|---|---|---|
| EP | 2495941 A1 | 9/2012 | | |
| WO | WO 2014162260 A1 * | 10/2014 | | G03B 17/56 |

* cited by examiner

BASE FOR A TABLET COMPUTER

BACKGROUND

Tablet computers are gaining more and more popularity in the market nowadays because of their mobility, size as well as increased processing power and battery life. People can use a tablet computer to capture photos, read e-books, surf the Internet, etc. A tablet computer usually does not have a dedicated physical keyboard and instead a user can use its touch screen for interaction. To enhance the capability of a tablet computer, a base is often manufactured so that the tablet computer can removably dock to the base. The base can include many devices such as keyboard, touch pad, hard disk drive, etc that the tablet computer can have access to.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

An example of a base apparatus for use by a tablet computer is disclosed. The base apparatus may include a plurality of peripheral devices capable of operating according to different wireless communication protocols; a plurality of demultiplexers to respectively couple to the plurality of peripheral devices; and a plurality of wireless communication modules respectively coupled to the demultiplexers. The demultiplexers can be configured to transmit signals received from the plurality of peripheral devices to the tablet computer in a wired way or transmit signals received from the plurality of peripheral devices to the wireless communication modules based on whether the tablet computer is connected to or detached from the base apparatus. The wireless communication modules can be configured to transmit wirelessly signals received from the demultiplexers to the tablet computer.

In the following, examples of the present disclosure are described with reference to the drawings.

Figure 1:
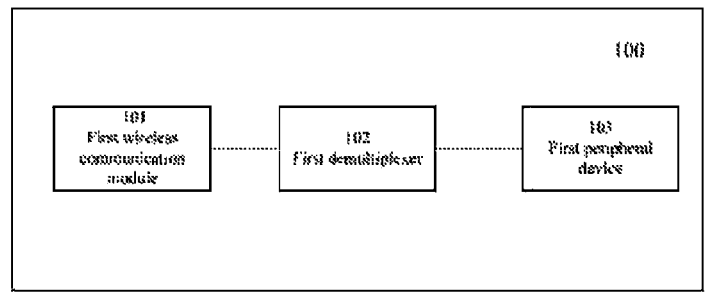
FIG. 1 is a block diagram of a base apparatus for use by tablet computer according to an example of the present disclosure.

FIG. 1 is a block diagram of a base apparatus for use by a tablet computer according to an example of the present disclosure. The base apparatus 100 can detachably connect to a tablet computer (not shown) through its connector (not shown). The base apparatus 100 and the tablet computer can be referred to as a hybrid computing system together. Oftentimes, they are also sold together in the market. But they can also be manufactured and sold separately.

As shown, the base apparatus 100 may include a first device (herein referred to as peripheral device) 103 such as key board, mouse, hard disk drive, secure digital (SD) card reader, etc, to which the tablet computer can have access. For example, the tablet computer can utilize the peripheral device 103 both in a wired way and in a wireless way. When the tablet computer is connected to the base apparatus 100, they can communicate in a wired way, that is to say, a signal from a peripheral device such as 103 can be transmitted to the tablet computer through wires and vice versa. A signal path can be from peripheral device 103 to a demultiplexer 102, and then to the connector, which is coupled to the demultiplexer and can be used to dock to the tablet computer. From the connector, the signal will finally reach the tablet computer.

In addition to wired communication between them, the base apparatus 100 and the tablet computer can also communicate wirelessly. The peripheral device 103 can operate according to a first wireless communication protocol. For example, a peripheral device 103 such as an input device can operate according to a low speed wireless communication protocol such as Bluetooth protocol. In order to achieve wireless communication, the base apparatus 100 may further include a first demultiplexer such as 102 which is coupled to the first peripheral device 103 and a first wireless communication module such as 101 which is coupled to the first demultiplexer 102, as shown in FIG. 1.

The first demultiplexer 102 can be configured to transmit signals received from the first peripheral device 103 to the tablet computer in a wired way or transmit signals received from the first peripheral device 103 to the first wireless communication module 101 based on whether the tablet computer is connected to or detached from the base apparatus 100. For example, when it is detected that the tablet computer is removed from the base apparatus 100, the first demultiplexer 100 can transfer signals from the peripheral devices 103 to the first wireless communication module 101, which can be configured to transmit wirelessly signals received from the first demultiplexer 102 to the tablet computer.

In another example, although not shown in FIG. 1, the base apparatus 100 can further include other peripheral device(s). For instance, a second peripheral device capable of operating according to a second different wireless communication protocol can be included. The second peripheral device for example can be a storage disk that can operate according to a high speed wireless communication protocol, including but not limited to e.g. a wireless local area network (WLAN) protocol such as 802.11b/n/g. In this example the base apparatus 100 can further include a second demultiplexer coupled to the second peripheral device and a second wireless communication module coupled to the second demultiplexer. Similar to the first demultiplexer and the first wireless communication module described above, the second demultiplexer can be configured to transmit signals received from the second peripheral device to the tablet computer in a wired way or transmit signals received from the second peripheral device to the second wireless communication module based on whether the tablet computer is connected to or detached from the base apparatus; and the second wireless communication module can be configured to transmit wirelessly signals received from the second demultiplexer to the tablet computer.

Please be noted that, different peripheral devices that can operate according to the same wireless communication protocol (e.g. input devices such as a keyboard and a touch pad) can be coupled to the same demultiplexer such as the first demultiplexer 102 in FIG. 1.

Figure 2:
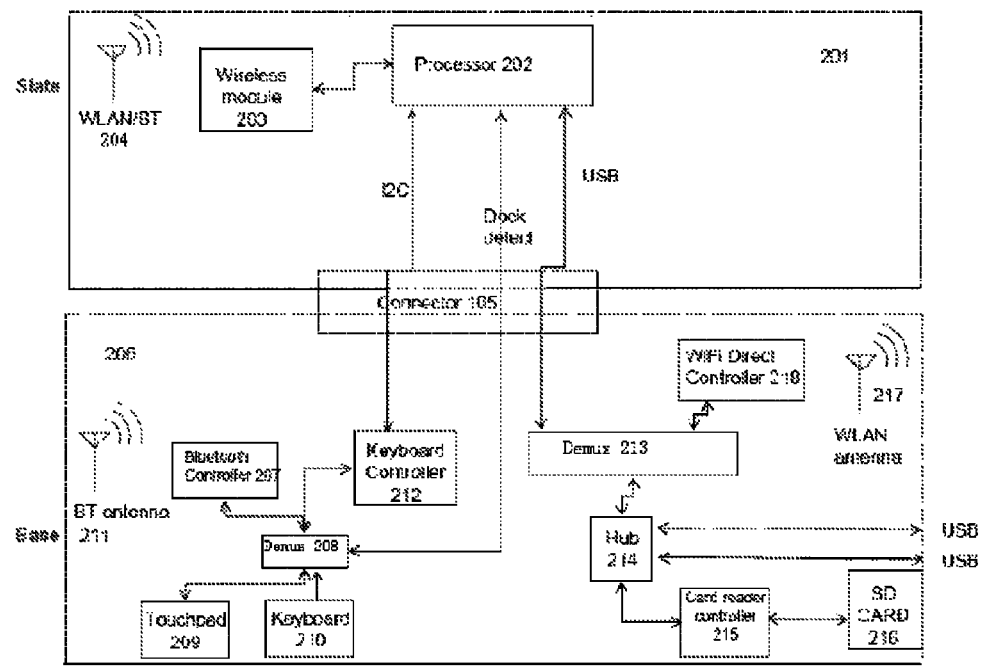
FIG. 2 is a block diagram of a hybrid computing system according to an example of the present disclosure.

With reference to FIG. 2 now, FIG. 2 is a block diagram of a hybrid computing system 200 according to an example of the present disclosure. The hybrid computing system 200 includes a base device 206, an example of which has been described in regard to FIG. 1, and a tablet computing device 201 detachably coupled to the base device 206. The base device 206 may include a number of components that are capable of operating according to different wireless communication protocols, including but not limited to touch pad 209 and keyboard 210 which can operate according to a low speed wireless communication protocol such as Bluetooth, or card reader controller 215, SD card 216, USB devices that can operate according to a high speed wireless communication protocol such as Wireless Fidelity (WiFi) protocol. In this example each of these components within the base device 206 can communicate with the tablet computing device 201 according to a respective one of the different wireless communication protocols when the tablet computing device 201 is detached from the base device 206.

As shown in FIG. 2, low-speed wireless communication enabled components such as the touch pad 209 and the keyboard 210 connect to a demultiplexer 208 which in turn connects to the keyboard controller 212 and a wireless controller such as Bluetooth controller 207. Similarly, high speed wireless communication enabled components such as card read controller 215 and USB devices are coupled to another demultiplexer 213 through a hub 214. The demultiplexer 213 is also connected to another wireless controller such as WiFi direct controller 218.

The demultiplexers 208 and 213 can each be configured to detect whether the tablet computing device 201 is detached from the base device 206, as shown by the dock detect line in FIG. 2. Please be noted that although a dock detect line is depicted from the processor 202 to the demultiplexer 208, it will be appreciated that an additional dock detect line can exist between the processor 202 and the demultiplexer 213 and that one of these detect lines are needed to detect whether the tablet computing device 201 is detached from the as device 206 or not.

If it is detected that the tablet computing device 201 is detached from the base device 206, the demultiplexer 208 can direct a signal from the touchpad 209 and the keyboard 210 towards the Bluetooth controller 207 and then the Bluetooth controller 207 can transmit the signal received from the demultiplexer 208 to the tablet computing device 201 wirelessly by way of the BT antenna 211, so that the input device on the as device 206 can be used to control the tablet computing device 201. Similarly, the demultiplexer 213 can direct a signal from the hub 214 towards the WiFi direct controller 218, which then can transmit the signal to the tablet computing device 201 through the WLAN antenna 217, so that a user holding the tablet computing device 201 can view e.g. documents or movies stored in the SD card 216. In another example, the base device 206 can connect to a TV through a HDMI line (not shown) and a user holding the tablet computing device 201 can display pictures taken and stored in the tablet computing device 201 on the TV.

On the other hand, if it is detected that the tablet computing device 201 is connected to the base device 206 through the docking connector 105, then the demultiplexer 208 can direct a signal from the touchpad 209 and the keyboard 210 to the keyboard controller 212. The keyboard controller 212 can translate the signal into an appropriate format such as one that conforms to I2C protocol and then transmit the signal to the processor 202 of the tablet computing device 201. Similarly, in the state of being connected, the demultiplexer 213 can transmit signals from hub 214 to the processor 202 through USB lines shown in FIG. 2.

The WLAN/BT antenna 204 in the tablet computing device 201 can be used to receive signals from the base device 206 or transmit signals from the tablet computing device 201 to the base device 206 and the wireless module 203 can be configured to receive and process signals from the antenna 204 and transfer the signals to the processor 201. Although FIG. 2 shows as combo antenna configuration, it will be appreciated that the antennas used for low speed and high speed communication respectively can be configured in any other suitable way and the present invention is not limited in this regard. Also, it should be understood that the tablet computing device 201 can include many other components including but not limited to camera, display screen, speaker, microphone, etc. It is also appreciated that although FIG. 2 shows two demultiplexers 208 and 213, the base device 206 can include more demultiplexers as needed.

As described above, an example of the present disclosure separates the wireless communication interfaces for components with different speeds. This can leverage the current device infrastructure and may reduce software or other customization effort, because for example the low speed interface devices like mouse/keyboard normally use Bluetooth rather than 802.11 WiFi currently. In addition, this may help avoid impacting the performance of the hybrid computing system and increasing the complexity to have all the components working together by having all of them share the same communication link such as 802.11 WiFi link.

In the above examples, the tablet computing device 201 has a processor and an operating system but the base device 206 does not have them. However, according to another example of the present disclosure, the base device 206 can also have an independent processor and an operating system. In such circumstances, there may exist some other mechanisms in the hybrid computing system to determine which operating system is taking control over the components on both devices 201 and 206 at a specified time point. For example, when it is detected that the tablet computing device 201 is detached from the base device, the wireless modules on them (including controllers 203 and 207 and respective antennas) can be enabled to match with each other. Once a wireless connection is established therebetween, a user can be enabled to select which operating system should take control by for example popping up options in the display screen of the tablet computing device 201 for the user to choose. If the user has made the selection, then the operating system that is not selected and the co-located processor can be powered down or disabled to save power. The user can also switch from the operating system currently running on one of the tablet computing device 201 and the base device 206 to the operating system running on the other of devices 201 and 206 by any appropriate software setting or hardware design. If it is detected that the tablet computing device 201 and the base device 206 are once again connected together, then the control can be switched to the operating system on the base device 206 because the base device 206 usually has more processing power than the tablet computing device 201.

Figure 3:
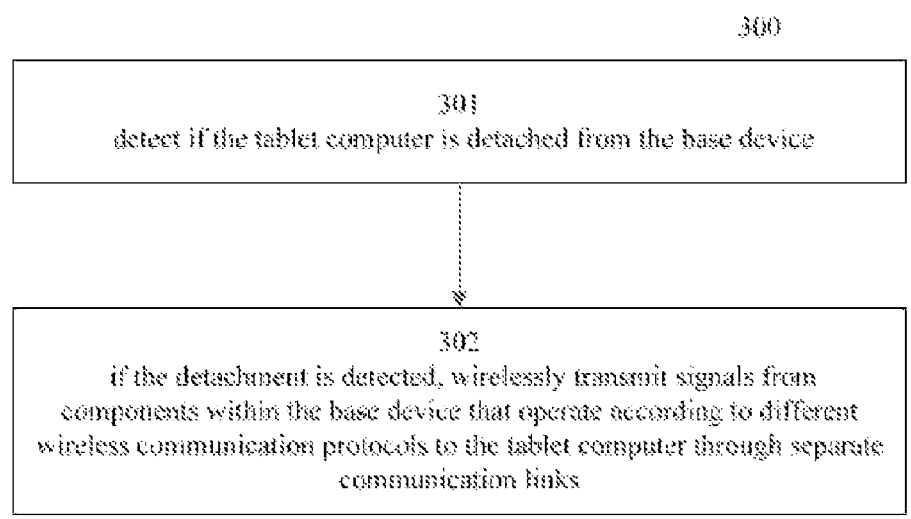
FIG. 3 is a process flow diagram for a method of operating a hybrid computing system according to an example of the present disclosure.

With reference to FIG. 3 now, FIG. 3 is a process flow diagram for a method 300 of operating a hybrid computing system according to an example of the present disclosure. The hybrid computing system can include a base device and a tablet computer that can detachably couple to the base device, as described above. At block 301, it is detected if the tablet computer is detached from the base device. At block 302, if the detachment is detected, signals from components within the base device that operate according to different wireless communication protocols are wirelessly transmitted to the tablet computer through separate communication links.

According to another example of the present disclosure, the method 300 can further comprise transmitting said signals from components within the base device to the tablet computer through wires if it is detected that the tablet computer is connected to the base device. In yet another example, the method 300 can further comprise disabling a wireless communication function in the base device upon detecting that the tablet computer is connected to the base device. In this way, power saving can be achieved.

From the above depiction of the implementation mode, the above examples can be implemented by hardware, software or firmware or a combination thereof. For example the various methods, processes, modules and functional units described herein may be implemented by a processor (the term processor is to be interpreted broadly to include a CPU, processing unit, ASIC, logic unit, or programmable gate array etc.) The processes, methods and functional units may all be performed by is single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

What is claimed is:

1. A base apparatus, comprising:
    a first peripheral device including a keyboard to operate according to a low speed wireless communication protocol;
    a second peripheral device including a storage device to operate according to a high speed wireless communication protocol;
    a first demultiplexer coupled to the first peripheral device;
    a second demultiplexer coupled to the second peripheral device;
    a first wireless communication module coupled to the first demultiplexer; and
    a second wireless communication module coupled to the second demultiplexer;
    wherein the first demultiplexer and the second demultiplexer are to transmit signals received from the first peripheral device and the second peripheral device, respectively, to a tablet computer in a wired way or transmit signals received from the first peripheral device and the second peripheral device to the first wireless communication module and second wireless communication module, respectively, based on whether said tablet computer is connected to or detached from said base apparatus; and said first wireless communication module and said second wireless communication module are to transmit wirelessly signals received from respective first demultiplexer and second demultiplexer to the tablet computer.

2. The base apparatus of claim 1, wherein the first peripheral device further includes a touchpad.

3. The base apparatus of claim 1, wherein the second peripheral device includes a USB hub.

4. The base apparatus of claim 1, further comprising a connector that docks to the tablet computer, wherein the first demultiplexer and the second demultiplexer couple to the connector so that when the connector docks to the tablet computer, the first demultiplexer and the second demultiplexer transmit signals to the connector.

5. The base device of claim 4, wherein the connector includes at least one dock detect line.

6. The base device of claim 4 wherein the keyboard and a touchpad communicate through the connector using I2C protocol and the storage device communicates through the connector using USB protocol.

7. The base device of claim 1, wherein the low speed wireless protocol is Bluetooth protocol and the high speed wireless protocol is WLAN protocol.

8. The base device of claim 1 further comprising an independent processor and an independent operating system.

9. A hybrid computing system, comprising:
    a base device comprising a number of components including a keyboard that operate according to a low speed wireless communication protocol and a storage device that operates according to a high speed wireless communication protocol;
    a tablet computing device detachably coupled to said base device;
    a respective demultiplexer coupled to each of the components; and
    a respective wireless controller coupled to each respective demultiplexer;
    wherein said respective demultiplexer is to detect that the tablet connector is detached from the base connector and direct a signal from a component coupled thereto towards the respective wireless controller and the respective wireless controller is to transmit the signal received from the respective demultiplexer to the tablet computing device wirelessly;
    wherein each of the components communicate with the tablet computing device according to respective low speed or high speed wireless communication protocols when the tablet computing device is detached from the base device and wherein each of the components communicate with the table computing device according to a wired protocol when the tablet computing device is attached to the base device with the connector.

10. The system of claim 9, wherein said low-speed wireless communication protocol is coupled to a touchpad and said high-speed wireless communication protocol is coupled to a USB hub.

11. The system of claim 9, wherein said low-speed wireless communication protocol is Bluetooth protocol and said high-speed wireless communication protocol is a WLAN protocol.

12. The system of claim 9, wherein the base device further comprises:
    a connector to dock to the tablet computing device.

13. The hybrid computing system of claim 9 further comprising a first processor and a first operating system in the tablet computing device and a second processor and a second operating system in the base device.

14. The hybrid computing system of claim 9 wherein the tablet computing device is configured to allow a user to switch between running the first operating system on the tablet computing device and the second operating system on the base device.

15. The hybrid computing system of claim 9 wherein the keyboard and a touchpad communicate through a connector using I2C protocol and the storage device communicates through the connector using USB protocol.

16. A method for operating a hybrid computing system, said method comprises:

detecting if a tablet computer is detached from a base device;

if the detachment is detected, wirelessly transmitting signals from components including a keyboard within the base device that operate according to low speed wireless communication protocol and storage components within the base device that operate according to high speed wireless protocols to the tablet computer through separate communication links; and if it is detected that the tablet computer is connected to the base device, transmitting said signals to the tablet computer through wires with respective separate wired protocols;

wherein a respective demultiplexer for a component is to detect that the tablet connector is detached from the base connector and direct a signal from the component coupled thereto towards a respective wireless controller and the respective wireless controller is to transmit the signal received from the respective demultiplexer to the tablet computer wirelessly.

17. The method of claim 16, further comprising:

disabling a wireless communication function in the base device upon detecting that the tablet computer is connected to the base device.

18. The method of claim 16 further comprising communicating through a connector using I2C protocol for the keyboard and a touchpad and using USB protocol for the storage device.

19. The method of claim 16 further comprising allowing a user to select between a first operating system on the tablet computer and a second operating system running on the base device.

20. The method of claim 16 wherein the low speed wireless protocol is Bluetooth protocol and the high speed wireless protocol is WLAN protocol.

\* \* \* \* \*